United States Patent

Harrand et al.

[11] Patent Number: 5,987,488
[45] Date of Patent: Nov. 16, 1999

[54] MATRIX PROCESSOR

[75] Inventors: Michel Harrand, Saint-Egreve; Jose Sanches, Meylan, both of France

[73] Assignee: SGS-Thomson Microelectronics S.A., Crolles Cedex, France

[21] Appl. No.: 08/994,953

[22] Filed: Dec. 19, 1997

[30] Foreign Application Priority Data

Dec. 27, 1996 [FR] France ................................. 96 16342

[51] Int. Cl.[6] ...................................................... G06F 7/32
[52] U.S. Cl. ............................................................ 708/520
[58] Field of Search ........................ 364/736.03, 736.05, 364/748.2; 395/563, 800.11, 800.02–800.09

[56] References Cited

U.S. PATENT DOCUMENTS

| | | | |
|---|---|---|---|
| 5,038,312 | 8/1991 | Kojima | 364/736.03 |
| 5,319,586 | 6/1994 | Gupta et al. | 364/736.03 X |
| 5,422,836 | 6/1995 | Beichter et al. | 364/736.03 |
| 5,499,375 | 3/1996 | Miyaguchi | 364/736.03 X |
| 5,590,070 | 12/1996 | Harrand et al. | |
| 5,590,345 | 12/1996 | Barker et al. | 395/800.11 |
| 5,592,428 | 1/1997 | Harrand | |
| 5,680,338 | 10/1997 | Agarwal et al. | 364/736.03 |

FOREIGN PATENT DOCUMENTS

| | | |
|---|---|---|
| 0 314 277 A3 | 8/1988 | European Pat. Off. |
| 0 570 951 A2 | 5/1993 | European Pat. Off. |
| 0 570 951 A3 | 5/1993 | European Pat. Off. |
| 0 724 221 A2 | 8/1995 | European Pat. Off. |

OTHER PUBLICATIONS

Yoshihiro Fujita, et al., "Integrated Memory Array Processor: A Prototype VLSI and a Real–Time Vision System," IEEE, 1993, pp. 82–91, Document No. XP000676998.

*Primary Examiner*—Tan V. Mai
*Attorney, Agent, or Firm*—Allen, Dyer, Doppelt, Milbrath & Gilchrist, P.A.

[57] ABSTRACT

A matrix computation processor comprises a control unit and a data memory, and a plurality of computation units. The plurality of computation units are controlled by the control unit by means of a control bus comprising: a first group of wires connected to the plurality of computation units conveying a common instruction to the plurality of computation units; and a plurality of second groups of at least one wire, each being connected respectively to one of the plurality of computation units, conveying an instruction complement specific to each computation unit of the plurality of computation units.

19 Claims, 2 Drawing Sheets

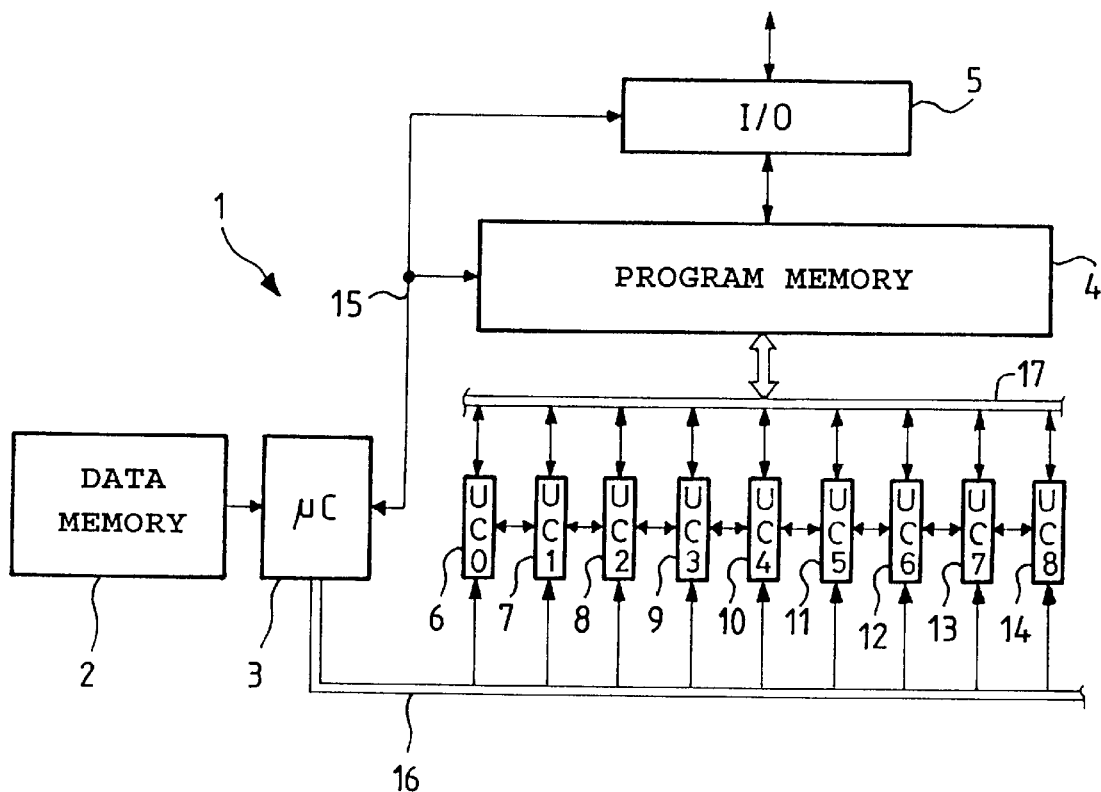
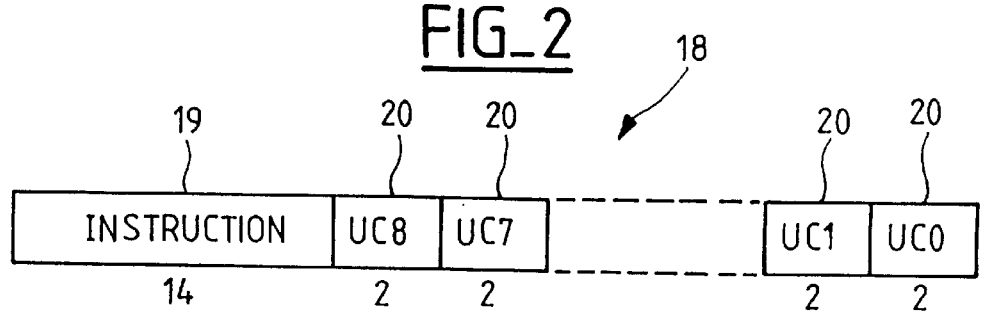

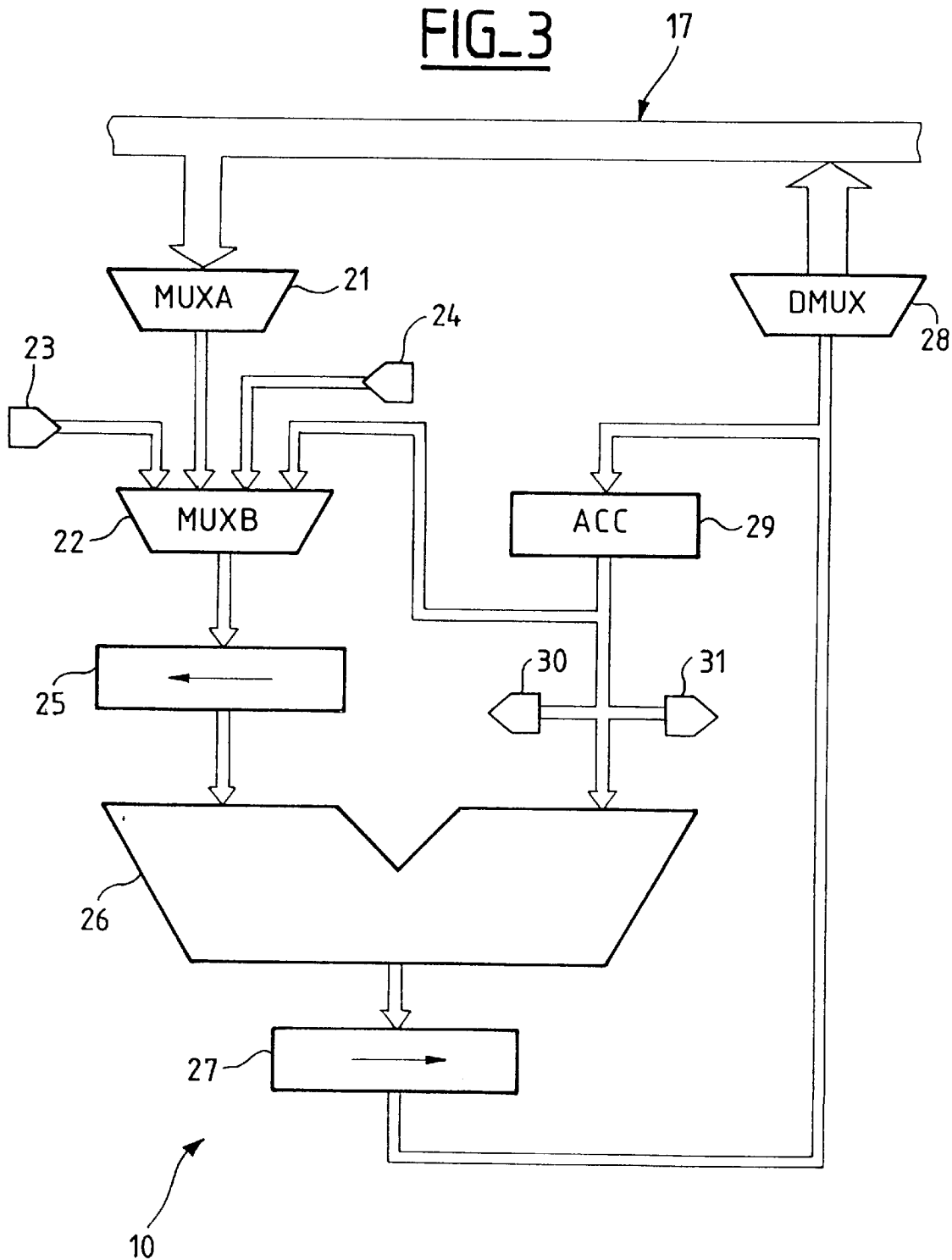

MATRIX PROCESSOR

FIELD OF THE INVENTION

The present invention is directed to processors for performing computations, such as for processing images, and, more particularly, to a matrix processor.

FIELD OF THE INVENTION

Digital image processing uses many operations of computation based on matrices. Conventionally, matrix filters are used to filter the images (with noise suppression or the addition of contrast). Furthermore, the transmission of digital images requires a compression of the images. There are many systems of encoding that exist at the present time, for example, MPEG for television or H261 and H263 for videophony. All of these image compression codes have the particular feature of requiring a very large number of matrix type computations.

For example, the H263 standard performs, among others, the following operations: the subdivision of the image into blocks, the prediction of the motion of each block in comparison with the neighboring blocks, the performance of cosine transforms on the different blocks, compacting by means of data compression encoding, and decoding and filtering of the image that has just been encoded to enable the encoding of the next image. Several tens of millions of computation instructions are needed at each second, solely for the encoding of the image. In the case of MPEG type encoding, the encoding uses equivalent techniques with a greater number of images and a higher definition leading to a correspondingly greater number of elementary operations.

Conventional methods use multiprocessor devices, arranged in rows or in matrices, controlled by an additional processor. These processors are controlled either individually or in groups. The individual commands actually make the system carry out far more operations than is strictly necessary. This is because the management of the communications of the processors is very lengthy, resulting in an oversizing of the system. The grouped commands require a lower level of protocol management and therefore slightly smaller systems, but all the processors do exactly the same thing. This leads to imperfections when computations are made, such as on the edges of an image.

SUMMARY OF THE INVENTION

In view of the foregoing background, it is therefore an object of the invention to make a processor dedicated to matrix computation that will use a plurality of computation units using instructions, a part of which will be common while another part will be dedicated to each computation unit. Preferably, the computation units will be made so as to achieve elementary operations used in image processing to obtain a processor particularly suited to the processing of images.

The matrix computation processor preferably comprises a control unit and a data memory. The processor comprises a plurality of computation units using data elements present in the data memory, with the plurality of computation units being controlled by the control unit by means of a control bus. The control bus preferably comprises: a first group of wires connected to the plurality of computation units to convey a common instruction to the plurality of computation units; and a plurality of second groups of at least one wire, each of the second groups being connected respectively to one of the computation units of the plurality of computation units, each second group conveying an instruction complement specific to each computation unit of the plurality of computation units. The instruction complements are aimed at specifying the operations to certain elements of each of the computation units that may be different from one computation unit to another.

Each computation unit has at least one $n+k$ bit accumulator having one input and one output of $n+k$ bits, the accumulator storing a data element in the computation unit; and one arithmetic and logic unit having first and second $n+k$ bit inputs and one $n+k$ bit output. The arithmetic and logic unit are preferably capable of performing different arithmetic and/or logic operations.

The computation units could also include other elements, such as: barrel-type leftward and/or rightward shifters capable of shifting the bits by at most $k-1$ bits towards the left and/or the right and having one $n+k$ bit input and one $n+k$ bit output that are parallel, an instruction indicating the leftward and/or rightward shift and an instruction complement indicating the number of bits on which the shift is performed. The computation units may also include a multiplexer to receive a word coming from at least one neighboring computation unit, wherein an instruction indicates the loading of a data element into the accumulator from a computation unit and an instruction complement indicates that computation unit from which the loading must be done.

Preferably, the data memory is organized so as to have m words of n bits accessible simultaneously, n and m being two integers, and the plurality of computation units comprises at most m computation units. Furthermore, each computation unit comprises at least one mode for the loading of a word of the memory into the computation units, wherein the instruction complement specifies, to each computation unit, a word among the m words of the memory to be loaded into the computation unit. In addition, or alternately, each computation unit may comprise at least one mode for the loading of a word into the memory, and wherein an instruction complement provides an indication, to each computation unit, of a word among the m words of the memory.

BRIEF DESCRIPTION OF THE DRAWINGS

The invention will be understood more clearly and other advantages shall appear from the following description of a preferred embodiment that does not restrict the scope of the invention, the description referring to the appended drawings, of which:

FIG. 1 gives a schematic view of a matrix computation processor according to the invention comprising several computation units, FIG. 2 shows the frame of the commands sent to the computation units, and FIG. 3 shows a preferred embodiment of a computation unit.

DETAILED DESCRIPTION OF THE PREFERRED EMBODIMENTS

The drawing of FIG. 1 shows a preferred embodiment of a matrix computation processor 1 according to the invention. The matrix computation processor 1 has a program memory 2, a microcontroller 3, a data memory 4, a data input/output interface 5, and a plurality of computation units 6 to 14. The program memory 2 contains one or more processing sequences to be performed on the data elements of the data memory 4. This memory is, for example, of the non-volatile type which may be programmable several times. The contents of the program memory 2 may contain, for example, the sequencing of an image processing algorithm. The program memory 2 will contain three types of instructions: instructions for the exchange of data between the data memory 4 and the exterior of the processor 1, instructions for the management of the matrix processor algorithm, and instructions for the generation of commands of the computation units 6 to 14.

The microcontroller 3 is connected to the program memory 2 to manage the matrix processing algorithm and the different elements of the processor 1 to perform the algorithm. The microcontroller 3 is also connected to an input/output bus 15 and a control bus 16. The input/output bus 15 is connected to the data memory 4 and to the input/output interface 5. By means of the input/output bus 15, the microcontroller 3 controls and checks the input and the output of the data of the data memory 4 with respect to the exterior of the processor 1 through the data input/output interface 5 as well as with respect to the computation units 6 to 14. The command bus 16, in the present example, has 32 wires, of which 14 wires set up a connection of the microcontroller 3 with all the computation units 6 to 14. The other 18 wires of the control bus correspond to nine pairs of wires setting up connections between the microcontroller 3 and, respectively, each of the nine computation units 6 to 14.

Each of the computation units 6 to 14 is connected to the microcontroller 3 by means of 16 wires which, in the present example, are distributed into two groups: a first group corresponding to the conveyance of an instruction common to all the computation units 6 to 14, a second group corresponding to the conveyance of an instruction complement proper to each of the computation units 6 to 14. The computation units 6 to 14 are also connected to the data memory 4 by means of a data bus 17. Preferably, the data bus 17 and the data memory 4 enable simultaneous access to as many words as there are computation units 6 to 14. Furthermore, in the present example, all the words of the data memory 4 are accessible to all the computation units 6 to 14. The control bus 16 conveys the commands intended for the computation units 6 to 14. In the present example, the bus has 32 wires, each conveying a control bit.

In the preferred embodiment shown in FIG. 1, nine computation units 6 to 14 are shown. Furthermore, the data memory 4 is organized into nine columns of words. These choices achieve the most efficient possible encoding of an image subdivided into 8×8 bit blocks that needs to have fictitious points located between the real points (with the use of a so-called half-pixel filtering in the H263 encoding). It is quite possible to obtain the same result with a data memory 4 organized into nine columns of words with only eight computation units 6 to 13, but this leads to a slowing down in the processing operation. Those skilled in the art can make many matrix processors with a number of computation units 6 to 14 different from that of the invention, the important point being that it is necessary to use at least as many computation units 6 to 14 as the matrix to be processed has rows and/or columns to optimize the computation time.

To reduce the time of access to the data memory 4 and limit conflicts of access in the data memory 4 between the input/output interface 5 and the computation units 6 to 14, it is preferable for the memory access operations to be managed comprehensively with the microcontroller 3. Furthermore, this enables the unloading of the units for the computation of the memory access operations. An approach of this type is possible only for matrix processing, considerably reducing the performance characteristics of the processor for non-matrix processing operations.

FIG. 2 shows the structure of a command 18 sent by the microcontroller to the computation units 6 to 14. The command structure 18 has a first bit group 19 corresponding to a general instruction intended for all the computation units 6 to 14 and two second bit groups 20 corresponding to an instruction complement intended respectively for each of the computation units 6 to 14.

Although there are 14 instruction bits available, there is no question of using $2^{14}$ instructions. In the present example, the instruction 19 corresponds to a microcommand, i.e. each bit directly activates one or more internal elements of each of the computation units 6 to 14. The instruction complements 20, on the contrary, will be addressed to different elements of each of the computation units 6 to 14, but conditionally as a function of the instruction 19. The conversion of eight into twelve bits is done by the addition of "zeros" in the most significant bits. The conversion of twelve into eight bits is done by the truncation of the most significant bits. The use of twelve-bit computation units enables higher precision for the processing of eight-bit integers and prevents a loss of time for certain arithmetic operations entailing carry values.

FIG. 3 shows a preferred exemplary embodiment of a computation unit 10, all the computation units 6 to 14 being identical. In the present example, the words stored in the data memory 4 are eight-bit words and the words processed in the computation units 6 to 14 are twelve-bit words. A first multiplexer 21 has as many word inputs as the data memory 4 can give words and it has one word output. All the word inputs are connected to the data bus 17. This first multiplexer 21 is used to choose the data element of the data memory to be processed in the computation unit 10.

A second multiplexer 22 has four word inputs and one word output. A first word input is connected to a first communications terminal 23. A second word input is connected to the output of the first multiplexer 21. A third word input is connected to the second communications terminal 24. The first and second communications terminals 23 and 24 are actually inputs of words coming from other computation units, for example from the neighboring units 9 and 11.

A leftward shifter 25 having one word input and one word output, has its input connected to the output of the second multiplexer 22. The leftward shifter 25 in the present example may perform leftward shifts of 0, 1, 2 or 3 bits, corresponding to operations of multiplication by 1, 2, 4 or 8.

An arithmetic and logic unit 26, having first and second word inputs and one word output, has its first input connected to the output of the leftward shifter 25. The arithmetic and logic unit 26 is of a fairly simple standard type. The following operations are available: addition, subtraction, comparison, transparency and different elementary logic functions.

A rightward shifter 27, having one word input and one word output, has its input connected to the output of the arithmetic and logic unit 26. The rightward shifter may, in the present example, perform rightward shifts of 0, 1, 2, or 3 bits, corresponding to integer divisions by 1, 2, 4 or 8.

A demultiplexer 28, having one word input and as many word outputs as there are data memories 4 may receive words at its input connected to the output of the rightward shifter 27. All the word outputs of the demultiplexer 28 are connected to the data bus. This demultiplexer 28 can be used to save the data present in the computation unit 10 at any location whatsoever of the data memory 4. Furthermore, the demultiplexer 28 is capable of having all its outputs simultaneously in a state of high impedance.

An accumulator 29, having one word input and one word output, has its input connected to the output of the rightward shifter 27 and its output connected firstly to the fourth input of the second multiplexer 22 and secondly to the second input of the arithmetic and logic unit 26. The accumulator 29 is a parallel register designed to memorize a word in the computation unit 10. In the present example, it is the only element of the computation unit 10 working synchronously, namely by means of a clock signal.

Output ports 30 and 31 are connected to the output of the accumulator 29. These output ports 30 and 31 are used to send data elements to neighboring computation units 9 and 11. One of the output ports 30 is connected to one of the terminals of a computation unit 9 and the other of the output ports 31 is connected to one of the terminals of a different computation unit 11.

Numerous variants are possible as will be perceived by those skilled in the art. The first and second multiplexers 21 and 22 may be combined in one and the same multiplexer. The first multiplexer 21 may have its inputs connected to only one part of the data bus 17 so as to receive only a few words and not the totality of the words available at output of the data memory 4. The second multiplexer 22 may be placed at a different position, for example, at the input of the accumulator 29 or after the leftward shifter 25.

The demultiplexer 28 is not indispensable. Its sole use is to gain time during the shifting of data in the data memory 4. However, if this demultiplexer 28 is eliminated, it must be replaced by a three-state buffer to avert conflicts on the data bus 4.

The leftward shifter 25 and the rightward shifter 27 may also be placed anywhere. However, it is preferable for the leftward shifter 25 to be located on the data path between the first multiplexer 21 and the arithmetic and logic unit 26, and it is preferable for the rightward shifter to be located on the data path between the arithmetic and logic unit 26 and the demultiplexer 28.

Variants can be envisaged for the accumulator 29 which can be positioned at the output of the arithmetic and logic unit 26 or at the output of the rightward shifter 27. It is also possible to add a second accumulator to the computation unit 10, but this risks slowing down the flow of data.

By way of an example, a detailed description shall be given of a structure of instructions so that those skilled in the art can have a clearer understanding of the interaction between the elements of each of the computation units 6 to 14 and the instructions 19 provided with instruction complements 20. In the present example, the instructions are on 14 bits and the instruction complements are on 2 bits for each computation unit.

The following is a breakdown of the instructions:

a first bit B0 indicates that it is an instruction, i.e. that if this first bit B0 is in a first state, then the computation units 6 to 14 do not take account of the instruction and do nothing, and if the first bit B0 is in the second state, then the instruction is taken into account by all the computation units 6 to 14;

a second bit B1 is addressed to the second multiplexer 22; when this second bit B1 is in a first state, then the second multiplexer 22 sets up a connection between its output and its second input (connected to the output of the first multiplexer 21); when this second bit B1 is in a second state, then the choice of the input to be connected with the output is determined by the bits providing the instruction complement dedicated to each computation unit;

a third bit B2 is addressed to the leftward shifter 25; when this third bit B2 is in a first state then the leftward shifter 25 does not perform any shift; when this third bit B2 is in a second state, then the leftward shifter 25 performs a leftward shift of 0 to 3 bits depending on the state of the bits providing the instruction complement dedicated to each computation unit;

a fourth bit B3 addresses the rightward shifter 27; when this fourth bit B3 is in a first state then the rightward shifter 27 does not perform any shift; when this fourth bit B3 is in a second state, then the rightward shifter 27 performs a rightward shift of 0 to 3 bits depending on the state of the bits providing the instruction complement dedicated to each computation unit;

the fifth to eighth bits B4 to B7 are addressed to the arithmetic and logic unit 26; these fifth to eighth bits B4 to B7 enabling the arithmetic and logic unit 26 to perform 16 different operations; the data element A being present at the first input and the data element B being present at the second input, the output, depending on the state of the fifth to the eighth bits B4 to B7, gives for example the following results: A, B, A+B, A−B, A AND B, A OR B, A XOR B, NON A, NON B, etc. (many operations being known to those skilled in the art);

the ninth to eleventh bits B8 to B11 are addressed to the first multiplexer 21; these ninth to eleventh bits B8 to B10 make it possible to obtain several modes of loading of data in each of the computation units 6 to 14: normal loading, "zero" loading, loading of "one", cross-loading, rightward loading, leftward loading, rightward loading with complement, leftward loading with complement;

the twelfth to fourteenth bits B11 to B13 are addressed to the demultiplexer 28; these twelfth to fourteenth bits B11 to B13 make it possible to obtain several modes of loading of data into the data memory 4: normal unloading, no unloading, cross-unloading, rightward unloading, leftward unloading, rightward unloading with complement, leftward unloading with complement.

The use of several modes of loading and unloading of data is used essentially in image encoding, but may be used in other applications. The following explanations will show the utility of the loading and unloading modes.

The normal loading includes loading the data elements in keeping to a matrix order of organization of the data memory 4. Each computation unit 6 to 14 receives a word in such a way that the first computation unit 6 receives a word from the first column of words of the memory 4, and the last computation unit 14 receives a word from the ninth column of words of the memory 4.

The loading of "zero" includes loading words of which all the bits are set at "zero" in all the computation units 6 to 14. The loading of "one" includes loading words of which all the bits are set at "one" in all the computation units 6 to 14. These two modes may be used to initialize the computation units 6 to 14 with fixed data elements especially for iterative loops.

The cross-loading includes cross-loading eight bytes of the memory. That is to say that data elements of a matrix processed in the matrix computation processor are exchanged by half-blocks, which is particularly useful for computations of motion vectors in image coding. The first to fourth computation units 6 to 9 respectively receive words from the fifth to eighth columns of the memory 4. The fifth to eighth computation units 10 to 13 respectively receive the words from the first to fourth columns of the memory 4. The ninth computation unit 14 does not load any word.

The rightward and leftward loading operations are used to perform computations on the edge of an image by extrapolation of the image. In the modes of loading without complement, the data elements of the "leftward" or "rightward" column (with reference to the left or right of the image) are loaded into the first two or last two computation units 6 and 7, or 13 and 14. The other computation units 8 to 14, or 6 to 12, load a data element shifted by one column leftward or rightward. In the modes of loading with complement, the complement of each of the computation units 6 to 14 indicates that the computation units 6 to 14 must load the contents of a column shifted by 0 to 3 columns (corresponding to 0 to 3 pixels) to the left or to the right.

The normal unloading includes unloading the data elements in keeping to a matrix order of organization in the data memory 4. Each computation unit 6 to 14 gives a word in such a way that the first computation unit 6 gives a word to the first column of words of the memory 4 and the last computation unit 14 gives a word to the ninth column of words of the memory 4.

The "no loading" mode positions the outputs of the demultiplexer 28 of each of the computation units 6 to 14 in a state of high impedance.

The crossed unloading includes unloading eight bytes into the memory in a crossed manner. That is to say that data elements processed in the matrix computation processor 1 are inverted by half-blocks after computation in the computation units 6 to 14. The first to fourth computation units 6 to 9 respectively give words to the fifth to eighth columns of the memory 4. The fifth to eighth computation units 10 to 13 respectively give words to the first to fourth columns of the memory 4. The ninth computation unit 14 does not unload any word, the outputs of the demultiplexer 28 of the ninth computation unit 14 being placed in a state of high impedance.

The rightward and leftward unloading operations are used to unload the contents of the computation units 6 to 14 after the data elements have been processed. In the modes of unloading without complement, the data elements of each of the computation units 6 to 14 are unloaded into a "left-hand" or "right-hand" column, the computation unit 6 or 14 located to the left or to the right having the outputs of its demultiplexer 28 in a state of high impedance. In the modes of loading with complement, the complement of each of the computation units 6 to 14 indicates that the computation unit of the computation units 6 to 14 must unload its contents into a column shifted by 1 to 3 columns leftward or rightward or must not carry out the unloading.

Not all the modes of loading and unloading are essential. Indeed, to simplify the matrix computation processor, it is possible to reduce the modes of loading to a loading without instruction complement, and use only a mode of loading without instruction complement.

All the combinations of instruction bits B0 to B13 cannot be used simultaneously. Indeed, the instruction complement should not be used simultaneously for two different functions except in special cases. To gain computation time, the computation instructions are preferably combined with a loading instruction.

The combination of the instruction bits and instruction complement bit may provide very many possibilities. For example, we may cite:

loading into the accumulators of all the computation units 6 to 14 by using any mode for the loading of data elements;

loading according to a fixed mode with rightward or leftward shift;

loading and performance of an operation in the arithmetic and logic unit (ALU) 26 with the contents of a data element present in the accumulator 29;

loading with rightward or leftward shift;

loading, leftward shift, operation in the ALU 26, rightward shift and storage in the accumulator 29; and operation in the ALU with a data element present in the accumulator of a neighboring computation unit and then unloading into the memory 36.

The list of possibilities is very great. Those skilled in the art could easily amplify the list with instructions corresponding to their needs. In the applications to image processing, the use of the instruction complement will enable the use of different weighting coefficients on each computation unit by means of leftward or rightward shifts. The data exchanges between the computation units 6 to 14 could differ between two computation units. It is also possible to load the data elements with the first computation unit 6 and shift the data elements after computation in the following computation units 7 to 14, thus creating an iterative process of the pipeline type.

Those skilled in the art could very well use instructions comprising a greater or smaller number of bits, a different number of data bits, a more ample arithmetic and logic unit 26, a smaller or greater number of instruction complement bits. Furthermore, depending on their needs, those skilled in the art could eliminate functional elements from the computation unit such as: the leftward shifters and/or rightward shifters 25 and 27, the first and/or second multiplexers 21 and 22, or the demultiplexer 28. Furthermore, other elements could be added and benefit from the instruction complement without going beyond the scope of the invention.

That which is claimed:

1. A matrix computation processor comprising:

a control unit and a data memory;

a plurality of computation units, wherein each control unit is connected to said data memory such that said plurality of computation units share a common data memory and use data elements present in the data memory; and a control bus connected to said control unit for permitting said plurality of computation units to be controlled by said control unit, said control bus comprising a first bus portion having a first group of wires connected to the plurality of computation units to convey a common instruction thereto, and a second bus portion having a plurality of second groups of at least one wire, each of the second groups being connected respectively to one of the computation units, each of the second groups conveying an instruction complement specific to each computation unit of the plurality of computation units.

2. A processor according to claim 1 wherein, n and k being two integers, each computation unit comprises:

at least one n+k bit accumulator having one input and one output of n+k bits, said accumulator storing a data element in the computation unit; and at least one arithmetic and logic unit having first and second n+k bit inputs and one n+k bit output, said arithmetic and logic unit being capable of performing different arithmetic and/or logic operations.

3. A processor according to claim 2, wherein each computation unit includes a barrel-type leftward shifter capable of shifting the bits by at most k−1 bits towards the left and having one n+k bit input and one n+k bit output that are parallel; and wherein an instruction indicates the leftward shift and an instruction complement indicates the number of bits on which the shift is performed.

4. A processor according to claim 2, wherein each computation unit includes a barrel-type rightward shifter capable of shifting the bits by at most k−1 bits towards the right and having one n+k bit input and one n+k bit output that are parallel; and wherein an instruction indicates the rightward shift and an instruction complement indicates the number of bits on which the shift is performed.

5. A processor according to claim 2, wherein each computation unit includes a multiplexer to receive a word coming from at least one neighboring computation unit; and wherein an instruction indicates the loading of the data element into the accumulator from a computation unit and an instruction complement indicates that computation unit from which the loading must be done.

6. A processor according to claim 1, wherein, n and m being two integers, the data memory is organized so as to have m words of n bits accessible simultaneously; and wherein the plurality of computation units comprises at most m computation units.

7. A processor according to claim 6, wherein each computation unit comprises at least one mode for the loading of a word of the data memory into said computation unit of the computation units; and wherein an instruction complement specifies, to each computation unit, a word among the m words of the data memory to be loaded into the computation unit.

8. A processor according to claim 6, wherein each computation unit comprises at least one mode for the loading of a word into the data memory; and wherein an instruction complement provides an indication, to each computation unit, of a word among the m words of the data memory.

9. A processor according to claim 1, further comprising means for receiving a image data into the data memory so that the processor performs image processing.

10. A matrix computation processor comprising:
   a control unit and a data memory;
   a plurality of computation units, wherein each control unit is connected to said data memory such that said plurality of computation units share a common data memory and use data elements present in the data memory, each computation unit comprising
      one n+k bit accumulator having one input and one output of n+k bits wherein n and k are two integers, said accumulator storing a data element in the computation unit; and
      one arithmetic and logic unit having first and second n+k bit inputs and one n+k bit output, said arithmetic and logic unit being capable of performing different arithmetic and/or logic operations; and
   a control bus connected to said control unit for permitting said plurality of computation units to be controlled by said control unit, said control bus comprising
      a first bus portion having a first group of wires connected to the plurality of computation units to convey a common instruction thereto, and
      a second bus portion having a plurality of second groups of at least one wire, each of the second groups being connected respectively to one of the computation units, each of the second groups conveying an instruction complement specific to each computation unit of the plurality of computation units.

11. A processor according to claim 10, wherein each computation unit includes a barrel-type leftward shifter capable of shifting the bits by at most k−1 bits towards the left and having one n+k bit input and one n+k bit output that are parallel; and wherein an instruction indicates the leftward shift and an instruction complement indicates the number of bits on which the shift is performed.

12. A processor according to claim 10, wherein each computation unit includes a barrel-type rightward shifter capable of shifting the bits by at most k−1 bits towards the right and having one n+k bit input and one n+k bit output that are parallel; and wherein an instruction indicates the rightward shift and an instruction complement indicates the number of bits on which the shift is performed.

13. A processor according to claim 10, wherein each computation unit includes a multiplexer to receive a word coming from at least one neighboring computation unit; and wherein an instruction indicates the loading of the data element into the accumulator from a computation unit and an instruction complement indicates that computation unit from which the loading must be done.

14. A processor according to claim 10, wherein, n and m being two integers, the data memory is organized so as to have m words of n bits accessible simultaneously; and wherein the plurality of computation units comprises at most m computation units.

15. A processor according to claim 14, wherein each computation unit comprises at least one mode for the loading of a word of the data memory into said computation unit of the computation units; and wherein an instruction complement specifies, to each computation unit, a word among the m words of the data memory to be loaded into the computation unit.

16. A processor according to claim 14, wherein each computation unit comprises at least one mode for the loading of a word into the data memory; and wherein an instruction complement provides an indication, to each computation unit, of a word among the m words of the data memory.

17. A processor according to claim 10, further comprising means for receiving a image data into the data memory so that the processor performs image processing.

18. A method for making matrix computation processor of a type comprising a control unit and a data memory, and a plurality of computation units, wherein each control unit is connected to said data memory such that said plurality of computation units share a common data memory and use data elements present in the data memory, the method comprising the step of:
   providing a control bus connected to said control unit for permitting said plurality of computation units to be controlled by said control unit, the step of providing the control bus comprising the steps of
      connecting a first bus portion having a first group of wires to the plurality of computation units to convey a common instruction thereto, and
      connecting a second bus portion having each of a plurality of second groups of at least one wire respectively to one of the computation units, each of the second groups conveying an instruction complement specific to each computation unit of the plurality of computation units.

19. A method according to claim 18, further comprising the step of providing means for receiving a image data into the data memory so that the processor performs image processing.

* * * * *

UNITED STATES PATENT AND TRADEMARK OFFICE
CERTIFICATE OF CORRECTION

PATENT NO. : 5,987,488
DATED : November 16, 1999
INVENTOR(S) : Harrand et al.

It is certified that error appears in the above-identified patent and that said Letters Patent is hereby corrected as shown below:

On the title page, item [73] should read: -- SGS-Thomson Microelectronics S.A., Gentilly, France --

Signed and Sealed this

Twenty-fifth Day of July, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

PATENT NO. : 5,987,488
DATED : November 16, 1999
INVENTOR(S) : Michael Harrand, Jose Sanches It is certified that error appears in the above-indentified patent and that said Letters Patent is hereby corrected as shown below:

Column 8, Line 40    Delete: "control"
                                         Insert -- computation--

Column 9, Line 39    Delete: "control"
                                         Insert -- computation--

Column10, Line 44    Delete: "control"
                                         Insert -- computation--

Signed and Sealed this

Thirteenth Day of March, 2001

*Attest:*

NICHOLAS P. GODICI

*Attesting Officer*        *Acting Director of the United States Patent and Trademark Office*